United States Patent [19]
Smith et al.

[11] Patent Number: 5,877,871
[45] Date of Patent: Mar. 2, 1999

[54] COMMUNICATION METHOD AND APPARATUS

[75] Inventors: Richard Douglas Lane Smith, Malvern, Great Britain; Jean-Benoit Besset, Paris, France

[73] Assignee: International Mobile Satellite Organization, England

[21] Appl. No.: 927,202

[22] PCT Filed: Jul. 27, 1994

[86] PCT No.: PCT/GB94/01618

§ 371 Date: Sep. 29, 1995

§ 102(e) Date: Sep. 29, 1995

[87] PCT Pub. No.: WO95/22224

PCT Pub. Date: Aug. 17, 1995

Related U.S. Application Data

[63] Continuation of Ser. No. 403,725, Sep. 29, 1995, abandoned.

[30] Foreign Application Priority Data

Feb. 9, 1994 [GB] United Kingdom .................... 9402501

[51] Int. Cl.⁶ ............................... H04N 1/32; H04N 1/00
[52] U.S. Cl. .......................... 358/442; 358/405; 358/407; 379/103; 455/12.1
[58] Field of Search .................................... 358/442, 400, 358/405, 406, 407, 435, 436, 438, 439, 440, 445; 455/12.1, 68, 33.1, 32.1; 379/58, 59, 103, 104

[56] References Cited

U.S. PATENT DOCUMENTS

| | | | |
|---|---|---|---|
| 5,343,305 | 8/1994 | Shiraogawa et al. | 358/407 |
| 5,422,733 | 6/1995 | Merchant et al. | 358/407 |
| 5,446,553 | 8/1995 | Grube | 358/402 |

FOREIGN PATENT DOCUMENTS

| | | | |
|---|---|---|---|
| 0 116 650 | 8/1984 | European Pat. Off. | H04N 1/32 |
| 0 314 122 | 5/1989 | European Pat. Off. | H04N 1/32 |
| 0 505 860 | 9/1992 | European Pat. Off. | H04N 1/42 |
| 0123833 | 5/1990 | Japan | 455/12.1 |
| 92/02100 | 2/1992 | WIPO | H04N 1/32 |
| WO9202100 | 2/1992 | WIPO | H04N 1/32 |

OTHER PUBLICATIONS

Mitsubishi, Acces Cell Fax Machines; brochure; 1991.

Dimolitsas et al., "Real–Time Transmission of Group 3 Facsimile over Interconnected Public Switched Digital Mobile Satellite Networks", Comsat Technical Review, vol. 22, No. 1, pp. 125–145(1992).

K.C. Halton, "The Evolution and Future of Group 3 Facsimile Standards", BT Technology Journal, vol. 12, No. 1, pp. 53–60 (1994).

Dimolitsas et al., "Group 3 Facsimile Transmission over Digital Satellite Land Mobile Networks", Vehicular Technology Society, 42nd VTS Conference, vol. 1, pp. 240–246 (1992).

Procedures for Documents facsimile Transmission in the General Switched Telephone Network. "Recommendation T.30", pp. 77–173.

*Primary Examiner*—Thomas D. Lee
*Assistant Examiner*—Jerome Grant II
*Attorney, Agent, or Firm*—Banner & Witcoff

[57] ABSTRACT

A facsimile interface apparatus (12) is connected between facsimile terminals (10, 24) communicating via a satellite (16). The interface apparatus converts a conventional facsimile signal (66, 68) to a signal (70, 72, 74) suitable for transmission to the satellite (16). However, the interface apparatus and the satellite may incur a long delay such that the calling facsimile terminal (10) repeats a transmitted signal while the response to that signal is being received over the satellite (16). To overcome this problem, the facsimile interface apparatus (12) connected to the calling terminal (10) sends, after a period t1, a holding signal (90) to the calling terminal (10), to prevent the calling terminal from repeating the transmitted signal (66, 68). After a further period t2, the interface apparatus (12) sends a command repeat signal (93) to the calling terminal (10), so that the transmitted signal (66, 68) is repeated if the called terminal (24) has not transmitted a response.

34 Claims, 5 Drawing Sheets

COMMUNICATION METHOD AND APPARATUS

This application is a continuation of application Ser. No. 08/403,725 filed Sep. 29, 1995 now abandoned.

The present invention relates to a communication method and apparatus and particularly, but not exclusively, to a facsimile interface apparatus for communication via a communication link, such as a satellite link or cellular telephone system.

Conventional facsimile terminals are designed for communication over a public service telephone network. Standard protocols have been adopted for communication between calling and called facsimile terminals. Examples of such protocols are those defined by the International Telegraph and Telephone Consultative Committee (CCITT) under Recommendations T.3 and T.4, known respectively as the Group 2 and Group 3 facsimile protocols. Recommendation T.30 defines a protocol for Group 2 and 3 facsimile equipment for communication over a telephone network.

An alternative means for communication between facsimile terminals has been proposed, in which each facsimile terminal is connected to a facsimile interface unit which converts analog modulated facsimile signals, suitable for communication via a public service telephone network, to encoded data suitable for transmission over a digital network, for example a digital satellite link or a cellular telephone system. However, the introduction of facsimile interface units into the circuit increases the delay between transmission and reception of a facsimile signal. This increased delay may cause failures in communication between the calling and called facsimile terminals. A standard for overcoming this increased delay is not provided under the Group 3 fax protocol.

The document WO 92/02100 discloses a facsimile interface unit which automatically sends a "command repeat" signal to a facsimile terminal on receipt of a command therefrom, in order to allow more time for a response signal to be received.

The article "Real-time transmission of group 3 facsimile over interconnected public switched digital mobile satellite networks", Comsat Technical Review 22 (1992) Spring, No. 1, pages 125 to 145, proposes programming a facsimile interface unit to send a sequence of flags to a facsimile terminal if no response signal is detected within a predetermined period of receiving a command therefrom so that the time limits for response set out in Recommendation T.30 are not exceeded at the facsimile terminal.

However, the facsimile terminal may still time out if no response is received at all or if the sequence of flags continues for too long.

The present invention provides a facsimile interface unit which detects a transmitted signal from a transmitting facsimile apparatus and detects whether a response signal to said transmitted signal is received from another facsimile apparatus within a predetermined period. If no response signal is detected after a predetermined period, a holding signal is sent to the transmitting apparatus and, if there is no response after a further period of time, a repeat signal is sent to the transmitting apparatus by the facsimile interface unit, such that the transmitting facsimile apparatus repeats the transmitted signal.

Preferably, the repeat signal is generated by the facsimile interface unit connected to the transmitting facsimile apparatus.

Thus, the transmitting facsimile apparatus may reliably communicate with the receiving apparatus over a circuit having a long delay.

Other aspects and preferred embodiments will be apparent from the following description and claims.

Embodiments of the present invention will now be described with reference to the accompanying drawings in which.

Figure 1:
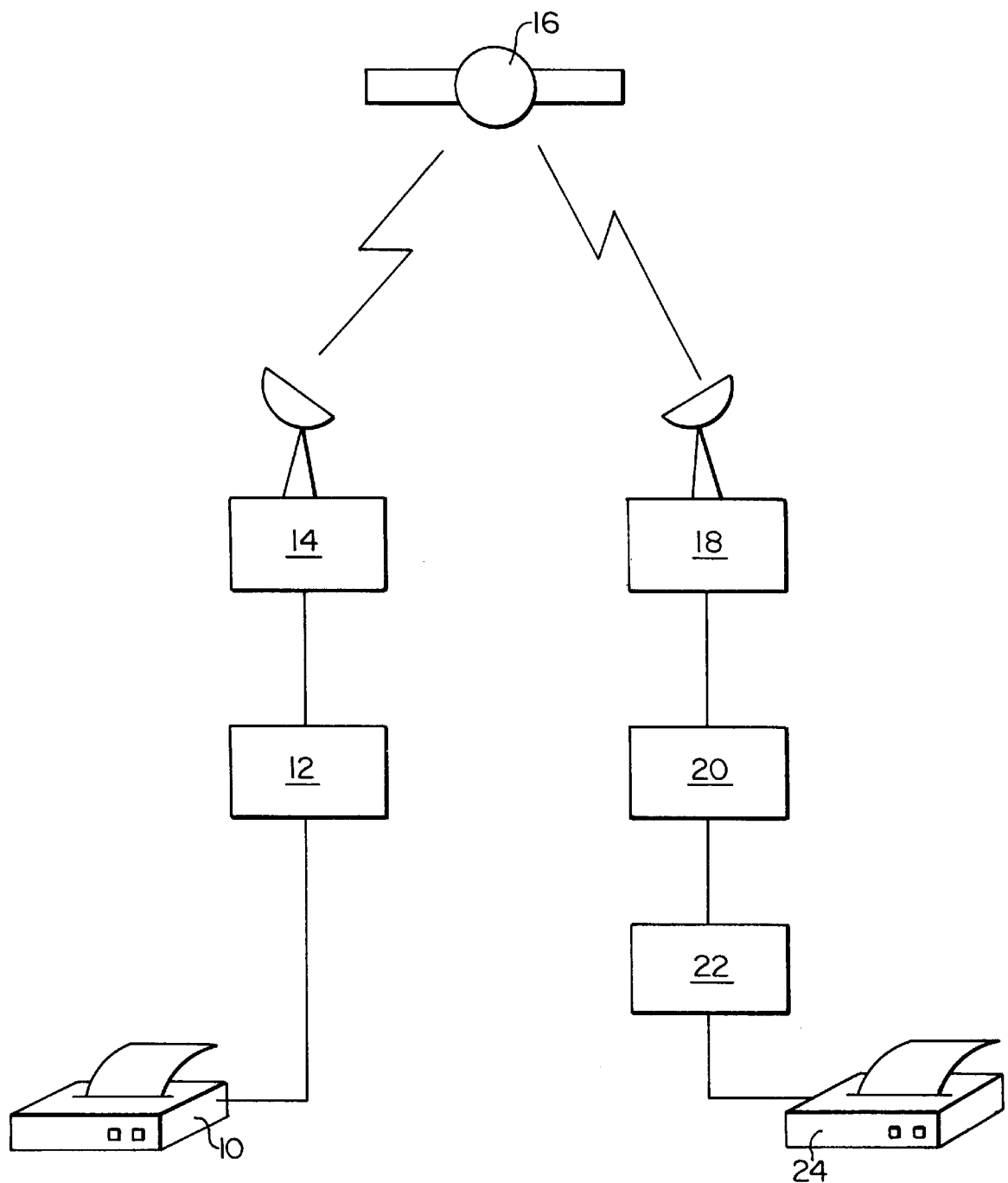
FIG. 1 is a diagram of a communications link between two facsimile terminals, including a satellite link, according to an embodiment of the invention.

In FIG. 1, a calling facsimile terminal 10 is connected to a mobile earth station 14 by means of a facsimile interface unit (FIU) 12. The mobile earth station 14 is designed to communicate directly with a communication satellite 16 which communicates with a fixed earth station 18. The signal is passed to a further facsimile interface unit 20 and is modulated so that it may be transmitted through a telephone network 22 to a called facsimile terminal 24. Likewise, response signals from said called facsimile terminal 24 are transmitted through the same circuit to the calling facsimile terminal 10. In this way, facsimile terminals may communicate via a satellite link to and from a mobile earth station. The mobile earth station may be a portable unit, a unit mounted on a vehicle or a ship, or a temporary installation.

Figure 2:
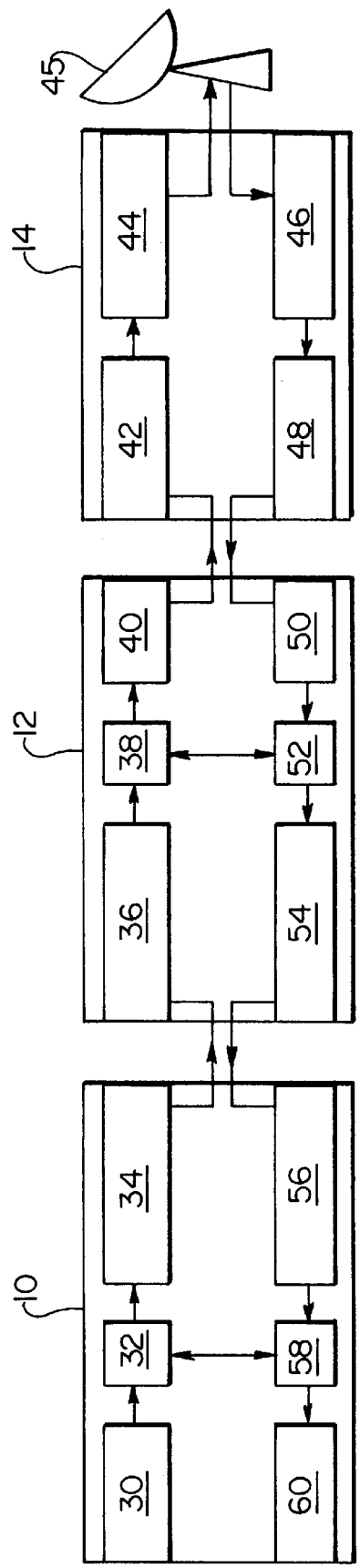
FIG. 2 is a block diagram of a facsimile terminal, a facsimile interface unit, and a mobile earth station forming part of FIG. 1.

As shown in FIG. 2, the calling facsimile terminal 10 comprises an input device 30, such as a scanner for scanning a document or an input port from a personal computer for sending facsimile data, and a facsimile transmission microprocessor 32 which encodes signals from the input device 30 according to a predetermined algorithm. The facsimile transmission microprocessor 32 also controls the operation of facsimile transmission, including call set-up, pre-message procedure, message transmission, post-message procedure and call release. The output of the facsimile transmission microprocessor 32, in the form of digital data, is modulated by a facsimile transmission modulator 34 to produce an analogue output suitable for transmission through a public service telephone network.

The analog output of the facsimile transmission modulator 34 is connected, either directly or through a telephone circuit, to the calling FIU 12, which demodulates the analog output to recover the digital facsimile data. As commercially produced facsimile terminals are not provided with a digital output port, it is not possible to receive a digital output directly from the calling facsimile terminal 10. The calling FIU 12 comprises a demodulator 36, which converts the modulated signal to digital data, a transmission microprocessor 38 which encodes the data and an output buffer 40 from which encoded data is transferred to the mobile earth station 14. In the mobile earth station 14, the data is modulated by a radio frequency (RF) modulator 42 connected to an RF transmitter 44, which transmits the signal to the satellite 16 by means of an antenna 45 directed at the satellite 16. The calling FIU 12 may be integrated with the mobile earth station 14.

The mobile earth station 14 further comprises an RF receiver 46 for receiving RF signals from the satellite 16, in this case RF signals transmitted by the called facsimile terminal 24. The received signal is demodulated by an RF demodulator 48 to produce a digital signal which is stored in an input buffer 50 in the calling FIU 12. Alternatively, the buffer 50 may be omitted. The digital signal is decoded by an FIU receiving microprocessor 52 and transferred to an FIU receiving modulator 54 which modulates the decoded data to produce an analog output signal suitable for reception by the calling facsimile terminal 10. The received signal is then demodulated by a facsimile receiving demodulator 56 in the calling facsimile terminal 10 to produce digital data, which is decoded by a facsimile receiving microprocessor 58. The facsimile receiving microprocessor 58 controls an output device 60 such as a printer to print a hard copy of the received facsimile, or an output port to a personal computer for receiving facsimile data.

The facsimile terminal 10 and mobile earth station 14 are known per se, and the above description thereof is merely illustrative.

Figure 3:
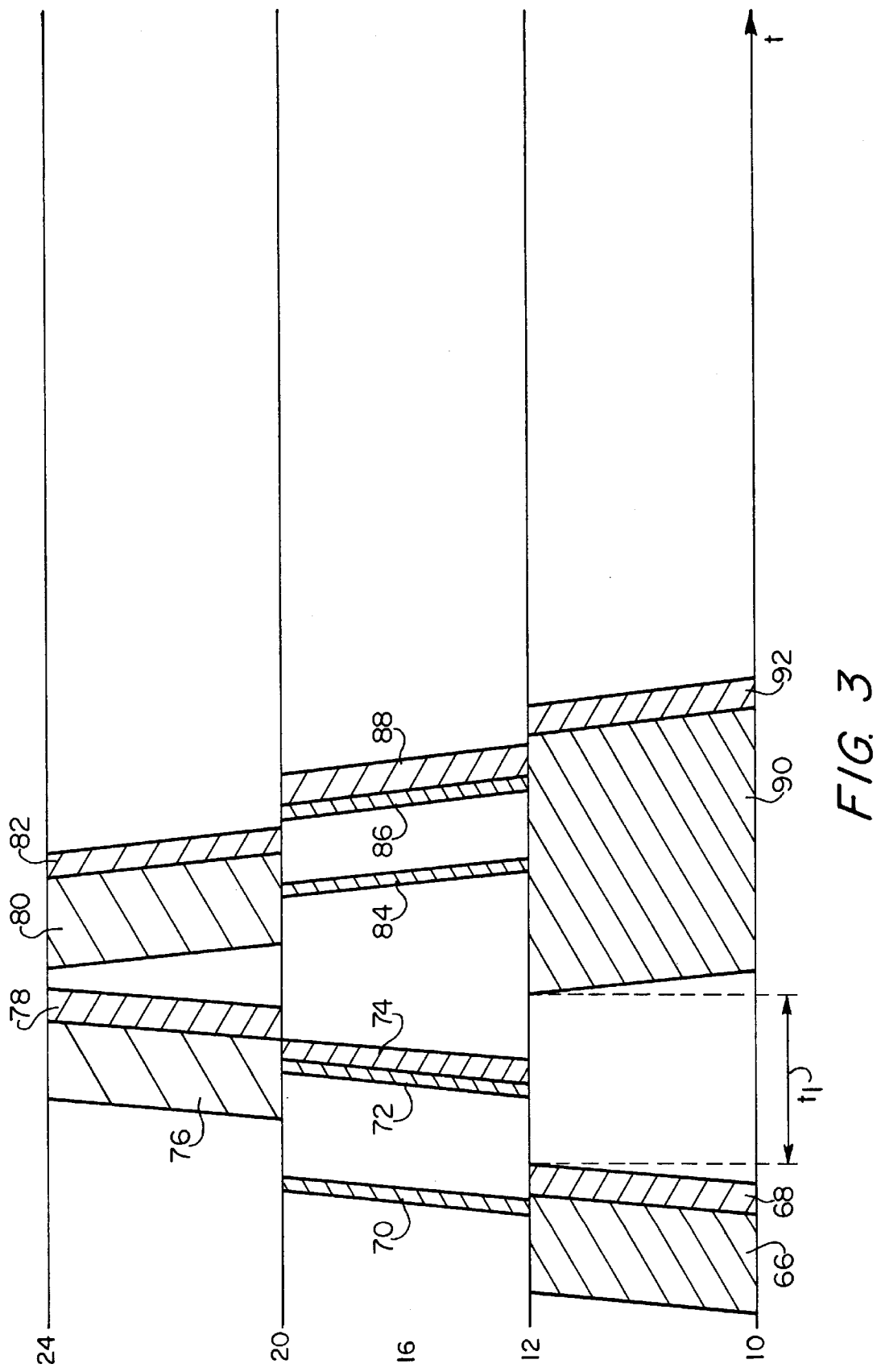
FIG. 3 is a time chart showing a late response to a signal transmitted over the satellite link.

FIG. 3 shows a time chart of a communication between the calling facsimile terminal 10 and the called facsimile terminal 24. In this time chart, the position of the elements in the circuit between facsimile terminals is represented by horizontal lines spaced apart on the vertical axis and time is represented on the horizontal axis such that the forwardly inclined bars extending in a generally vertical direction represent transmitted signals while the rearwardly inclined bars represent response signals.

To begin transmission of a new command (as for example under the protocol in T.30) the calling facsimile terminal 10 transmits a preamble signal 66 (as defined for example in T.30, section 5.3.1.). The preamble signal 66 does not contain any data but is transmitted so that subsequent protocol information may be passed unimpaired. The calling facsimile interface unit 12 encodes the preamble signal 66 as a preamble line control indicator 70 which is transmitted to the satellite 16. After the preamble signal 66, the calling facsimile terminal transmits a binary coded signal 68 containing protocol information (as described for example in T.30 section 5). In response to the binary coded signal 68, the calling facsimile interface unit 12 transmits a binary coded signal line control indicator 72 followed by a binary coded signal 74. In the called facsimile interface unit 20, the preamble and binary coded signal line control indicators 70, 72 and the binary coded signal 74 are decoded to generate a preamble signal 76 and a binary coded signal 78 for reception by the called facsimile terminal 24.

The called facsimile terminal 24 responds by transmitting a preamble 80 and a binary coded signal 82, which are encoded by the called facsimile interface unit 20 to generate a preamble line control indicator 84, a binary coded signal line control indicator 86 and a binary coded signal 88.

As shown in FIG. 3, considerable delays may be incurred in encoding the binary coded signal 68 in the calling facsimile interface unit 12 and in decoding the response from the called facsimile terminal 24. For example, the facsimile interface units 12 and 20 may together incur approximately a one second delay in transmission each way over the circuit, while transmission via the satellite 16 may incur approximately another quarter second each way. The telephone network 22 may incur a delay of approximately one third of a second, but this may vary depending on whether the network is designed for voice or data communication.

Finally, the time taken for the called terminal 24 to respond may vary from a few milliseconds to several seconds. Thus, the delay between the calling facsimile terminal 10 transmitting a signal and receiving a response may be at least three seconds. However, under T.30 section 5.4.2. the facsimile terminal will re-transmit a signal if no response is received within 3 s ±15%. Thus, in the prior art the calling facsimile terminal 10 may attempt to retransmit the signal 66, 68 while the calling interface unit 12 is decoding the response signal. As the calling facsimile terminal 10 does not operate in full duplex mode, the response signal will not be received successfully.

Under T.30 section 5.4.2., if no response is received after three calling attempts the calling facsimile terminal 10 will end the call without successfully completing the protocol exchange and transmitting the facsimile.

It has been proposed in the Comsat Technical Review, 22 (1992) Spring, No. 1, pages 135 and 136, to program the FIU transmission and receiving microprocessors 38 and 52 so that, once the FIU transmission microprocessor 38 has detected the end of the binary coded signal 68, after a period shorter than the repeat period of the calling facsimile terminal 10, the FIU receiving microprocessor 52 begins to send a sequence of flags 90 (as defined for example in T.30 section 5.3.3.) to the calling terminal 10 until the FIU microprocessor 52 detects receipt of the binary coded response signal 88. The flags 90 are interpreted by the calling terminal 10 as a signal that the called terminal 24 is responding (T.30 section 5.3.3., second paragraph). Thus, the calling terminal 10 does not repeat the transmitted signal 66, 88, and is therefore able to receive a decoded binary coded signal 92 from the calling facsimile interface unit 12 when a response is finally received. Thus, the acceptable delay for response is increased.

However, the called terminal 24 may not receive the binary coded signal 78 correctly and may not therefore transmit any response. For example, if the calling terminal 10 has just completed the transmission of a page of facsimile data, the called terminal 24 may activate a paper cutter to cut the reproduced sheet from a roll of paper. The paper cutter may create electrical noise which may interfere with the reception of signals, or reception may be disabled during activation of the paper cutter, so that the binary coded signal 78 may not be received correctly. If, for example, the binary code signal 78 is a "multi-page" signal, which instructs the called terminal that another page is to be transmitted, this problem will result in the called terminal 24 terminating the call without printing the further page. Moreover, if the sequence of flags 90 continues for too long, the calling terminal may time out and end the call without repeating the signals 66 and 68.

Figure 4:
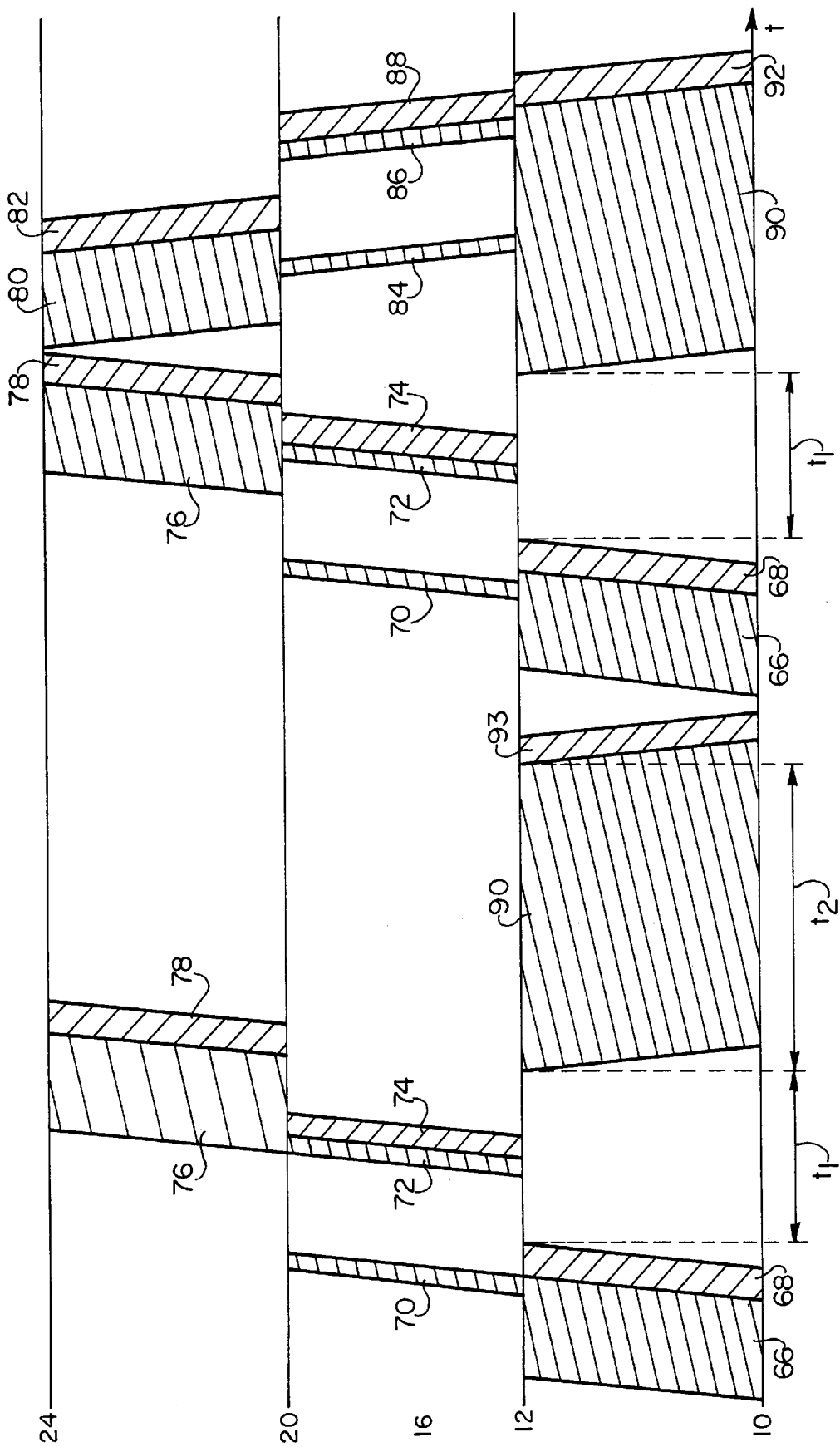
FIG. 4 is a time chart showing a case in which no response is received to a signal transmitted over the satellite link.
Figure 5:
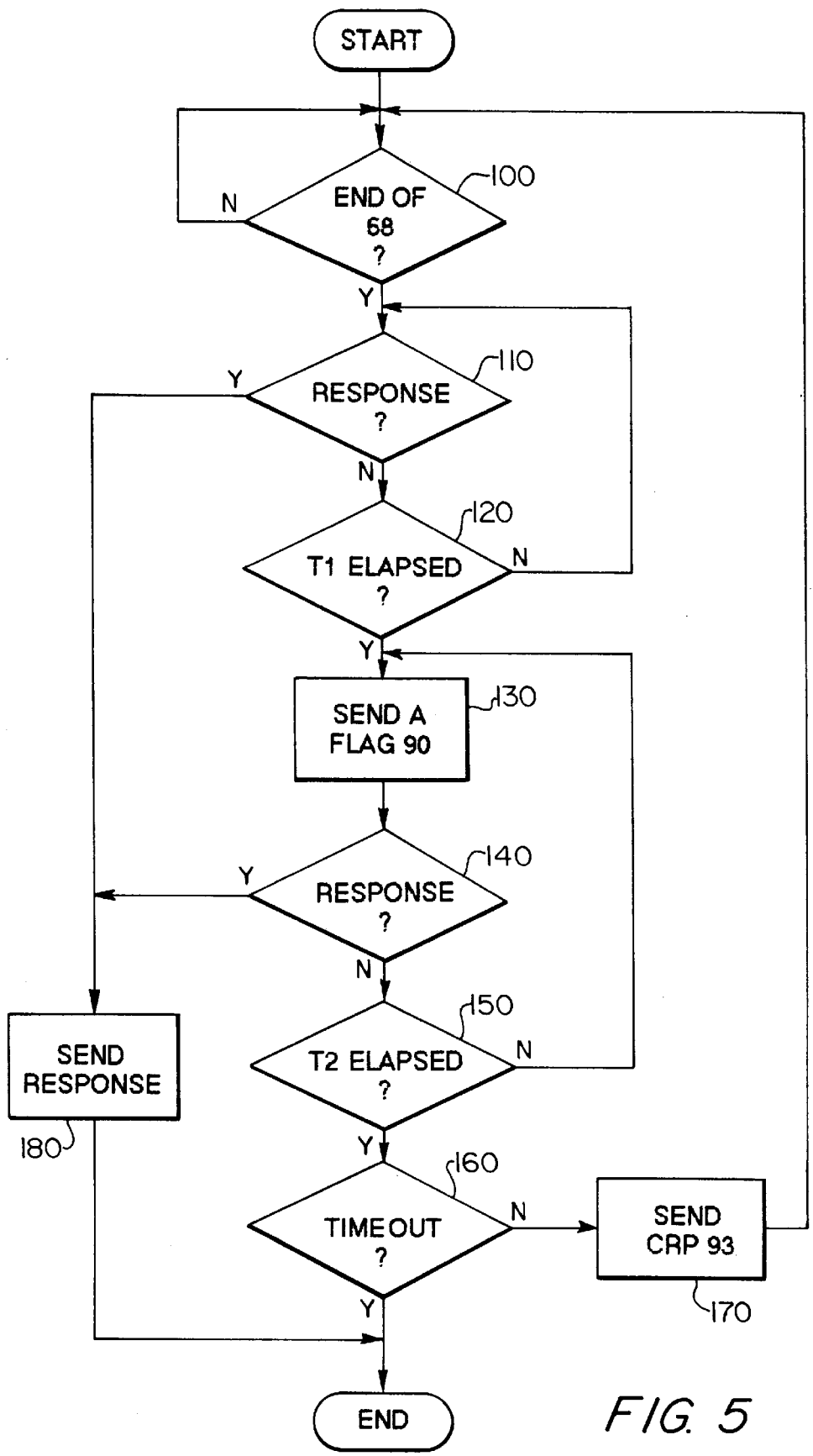
FIG. 5 is a flowchart of the operation of a facsimile interface unit according to an embodiment of the present invention.

The operation of an embodiment of the present invention which overcomes this problem is shown schematically in the time chart of FIG. 4 and the flowchart of FIG. 5. In this embodiment, the FIU transmitting microprocessor 38 detects the end of the binary coded signal 28 (step 100) transmitted by the calling facsimile terminal 10 and, a period t1 after the detection of the end of transmission of the binary coded signal 68 (determined by step 120), the FIU receiving microprocessor 52 begins to transmit a sequence of flags 90 to the calling terminal 10 (step 130). The period t1 is preferably about 2.4 seconds. If a response is received from the called terminal 24 by the calling FIU 12 at this stage (steps 110 or 140), the sequence of flags 90 is terminated and the response is sent through the calling FIU 12 to the calling terminal 10 (step 180).

After a period t2 (preferably about 2.7 seconds) of sending the flags 90 to the calling terminal 10 (step 150), the FIU receiving microprocessor 52 sends a "command repeat" signal 93 (step 170) to the calling terminal 10. Commercially available facsimile terminals are generally arranged to recognise the "command repeat" (CRP) signal, as defined under the Group 3 protocol. However, according to Recommendation T.30, section 5.3.6.1.8(2) the command repeat signal is used to indicate that the previous command was received in error and should therefore be repeated.

Thus, in response to the command repeat signal 93, the calling terminal 10 repeats the transmitted signal 66, 68. By this time, the called terminal 24 should be ready to receive the signal, since for example the paper cutter has completed its operation. Thus, a response is sent and is received as in the example of FIG. 3.

If, however, no response is received by calling the FIU 12 after a predetermined number of repeated transmissions 66, 68 or after a predetermined time has elapsed (step 160), the calling FIU 12 may end the above procedure and allow the calling terminal to time out and end the call.

Although in the above description the terminal 10 which transmits the signal 66, 68 is described as the calling terminal, the terminal 10 is not necessarily the terminal that initiated the call. In the context of this description, "calling" will be understood to mean transmitting a signal which requires a response.

Although in the above example the terminal 10, connected to the mobile earth station 14, is the calling terminal, a terminal connected to the telephone network 22 may instead be the calling terminal.

In that case, the period t1 set by the facsimile interface unit 20 is shorter than that set by the interface unit 12, to take account of delays in the telephone network 22; for example t1 may be about 1.4 seconds. Otherwise, the interface units 12 and 20 are similar in their calling operation.

Thus, embodiments of the present invention allow facsimile terminals to communicate with each other over a circuit incurring a long delay, even when the called terminal 24 does not respond to the first transmission of a signal. It is estimated that a success rate of 97% may be achieved for facsimile transmissions over a satellite link in the embodiment described above.

Although the above embodiment is described with reference to facsimile communication via a satellite link, the present invention may also be applied to other data communication circuits incurring a long delay, such as cellular communication systems.

Although facsimile data communication is described, the present invention may also be applicable to other data transmission (e.g. transmission of text files) in which embedded commands requiring replies are also transmitted.

The above description is given purely by way of example. Accordingly, various modifications may be envisaged which nevertheless are intended to form part of the present invention.

We claim:

1. A facsimile interface apparatus for connection between a transmitting and a receiving facsimile apparatus where a transmitted signal from said transmitting facsimile apparatus is intended to be eventually received by said receiving facsimile apparatus, comprising:

means for detecting said transmitted signal from said transmitting facsimile apparatus, means responsive to an absence of a response signal from said receiving facsimile apparatus within a first predetermined period for transmitting a holding signal to said transmitting facsimile apparatus and means responsive to the absence of said response signal within a second predetermined period for transmitting a repeat signal to said transmitting apparatus, such that said transmitting facsimile apparatus repeats said transmitted signal.

2. Apparatus as claimed in claim 1, including means for decoding a facsimile signal to generate facsimile data and means for encoding said facsimile data for transmission to a satellite.

3. Apparatus as claimed in claim 1, wherein said repeat signal is a command repeat signal.

4. Apparatus as claimed in claim 2, wherein said repeat signal is a command repeat signal.

5. A satellite earth station for communication via a satellite, including a facsimile interface apparatus for connection between a transmitting and a receiving facsimile apparatus where a transmitted signal from said transmitting facsimile apparatus is intended to be eventually received by said receiving facsimile apparatus, said facsimile interface apparatus comprising:

means for detecting said transmitted signal from said transmitting facsimile apparatus, means responsive to an absence of a response signal from said receiving facsimile apparatus within a first predetermined period for transmitting a holding signal to said transmitting facsimile apparatus and means responsive to the absence of said response signal within a second predetermined period for transmitting a repeat signal to said transmitting apparatus, such that said transmitting facsimile apparatus repeats said transmitted signal.

6. A satellite earth station as claimed in claim 5, wherein said repeat signal is a command repeat signal.

7. A satellite earth station as claimed in claim 5, wherein said facsimile interface apparatus includes means for decoding a facsimile signal to generate facsimile data and means for encoding said facsimile data for transmission to a satellite.

8. A satellite earth station as claimed in claim 7, wherein said repeat signal is a command repeat signal.

9. A method of facsimile communication between a transmitting and a receiving facsimile apparatus where a transmitted signal from said transmitting facsimile apparatus is intended to be eventually received by said receiving facsimile apparatus, a comprising:

receiving said transmitted facsimile signal;

if no response has been received within a first predetermined period after the receipt of said transmitted signal, transmitting a holding signal; and if no response signal has been received within a second predetermined period after the transmission of said transmitted signal, transmitting a repeat signal; whereby said transmitted facsimile signal is repeated.

10. A method as claimed in claim 9, wherein said transmitted facsimile signal and said response signal are transmitted via a satellite link, and said holding signal and said repeat signal are transmitted locally.

11. A method as claimed in claim 9, wherein said repeat signal is a command repeat signal.

12. A method as claimed in claim 11, wherein said transmitted facsimile signal and said response signal are transmitted via a satellite link, and said holding signal and said repeat signal are transmitted locally.

13. A facsimile interface apparatus for assisting in communication between a transmitting and a receiving facsimile apparatus where a transmitted signal from said transmitting facsimile apparatus is intended to be eventually received by said receiving facsimile apparatus, comprising:

means for detecting said transmitted facsimile signal, means for re-transmitting said detected transmitted facsimile signal to said receiving facsimile apparatus, means for detecting a response signal, and means for transmitting a repeat signal if no response signal is detected within a predetermined period, said predetermined period including at least a portion of time having elapsed after the re-transmission of said detected transmitted facsimile signal, such that the transmitted facsimile signal is repeated.

14. A method of data communication between a transmitting and a receiving facsimile apparatus where a transmitted signal from said transmitting facsimile apparatus is intended to be eventually received by said receiving facsimile apparatus, comprising:

receiving said transmitted data signal;

if no response is received within a first predetermined period after the receipt of said transmitted signal, transmitting a holding signal; and if no response is received within a second predetermined period after the receipt of said transmitted signal, transmitting a repeat signal;

whereby said transmitted signal is repeated.

15. A data interface apparatus for connection between a transmitting data apparatus and a receiving data apparatus, said transmitting data apparatus and said receiving data apparatus connected across a wireless link, comprising:

means for detecting a transmitted signal from said transmitting data apparatus, and means, responsive to the absence of a response signal from said receiving data apparatus within a predetermined period, for transmitting a repeat signal to said transmitting data apparatus, such that said transmitting data apparatus repeats said transmitted signal, said predetermined period including a portion of time after a re-transmission of said detected transmitted signal.

16. A data interface apparatus as claimed in claim 15, wherein said data is facsimile data.

17. A data interface apparatus as claimed in claim 16, including means for decoding a facsimile signal to derive said facsimile data and means for encoding said facsimile data for transmission to a satellite.

18. A data interface apparatus as claimed in claim 16, wherein said repeat signal is a command repeat signal.

19. A data interface apparatus as claimed in claim 15, including means for transmitting a holding signal to said transmitting apparatus after a predetermined interval shorter than the predetermined period from the detection of said transmitted signal.

20. A data interface apparatus as claimed in claim 19, wherein said data is facsimile data.

21. A data interface apparatus as claimed in claim 20, including means for decoding a facsimile signal to derive said facsimile data and means for encoding said facsimile data for transmission to a satellite.

22. A data interface apparatus as claimed in claim 20, wherein said repeat signal is a command repeat signal.

23. A data interface apparatus as claimed in claim 19, wherein said holding signal transmitting means is responsive to an absence of said response signal from said receiving apparatus within said predetermined interval to transmit said holding signal.

24. A method of data communication over a wireless link comprising:

receiving a transmitted signal from a transmitting data apparatus, sending a retransmitted signal in response to receipt of said transmitted signal to a receiving data apparatus, and if no response signal has been received from said receiving apparatus within a predetermined period after the receipt of said transmitted signal, transmitting a repeat signal to the transmitting data apparatus so as to cause the transmitting data apparatus to repeat the transmitted signal, wherein said predetermined period includes a portion of time after said re-transmission of said detected transmitted signal.

25. A method of data communication as claimed in claim 24, including, before said step of transmitting a repeat signal, transmitting a holding signal to the transmitting apparatus.

26. A method of data communication as claimed in claim 25, wherein said data is facsimile data.

27. A method of data communication as claimed in claim 26, wherein said repeat signal is a command repeat signal.

28. A method of data communication as claimed in claim 25, wherein said retransmitted facsimile signal and said response signal are transmitted via a satellite link, and said repeat signal is transmitted locally.

29. A method of data communication as claimed in claim 25, wherein said holding signal is transmitted if no response signal is received within a shorter period than said predetermined period.

30. A method of data communication as claimed in claim 24, wherein said data is facsimile data.

31. A method of data communication as claimed in claim 30, wherein said repeat signal is a command repeat signal.

32. A method of data communication as claimed in claim 30, wherein said retransmitted facsimile signal and said response signal are transmitted via a satellite link, and said repeat signal is transmitted locally.

33. A method of data communication as claimed in claim 24, wherein said retransmitted facsimile signal and said response signal are transmitted via a satellite link, and said repeat signal is transmitted locally.

34. A satellite earth station for communication via a satellite including a data interface for connection between a transmitting data apparatus and a receiving data apparatus, said transmitting data apparatus and said receiving data apparatus connected across a wireless link, comprising:

means for detecting a transmitted signal from said transmitting data apparatus, and means responsive to the absence of a response signal from said receiving data apparatus within a predetermined period for transmitting a repeat signal to said transmitting data apparatus, such that said transmitting data apparatus repeats said transmitted signal, said predetermined period including a portion of time after a re-transmission of said detected transmitted signal to said receiving data apparatus.

* * * * *